United States Patent [19]
Watson

[11] Patent Number: 5,289,271
[45] Date of Patent: Feb. 22, 1994

[54] CABLE TELEVISION-USAGE SYSTEM

[76] Inventor: John C. Watson, 110 Mayberry Rd., Gray, Me. 04039

[21] Appl. No.: 756,829

[22] Filed: Sep. 9, 1991

[51] Int. Cl.$^5$ .............................................. H04N 7/00
[52] U.S. Cl. .......................................... 348/1; 455/2; 455/6.2
[58] Field of Search ...................... 455/2, 4.2, 6.1, 6.2; 358/84, 86

[56] References Cited

U.S. PATENT DOCUMENTS

| | | | |
|---|---|---|---|
| 3,742,463 | 6/1973 | Haselwood et al. | 358/84 |
| 4,577,220 | 3/1986 | Laxton et al. | 358/84 |
| 4,723,302 | 2/1988 | Fulmer et al. | 455/2 |
| 4,752,954 | 6/1988 | Masuko | 380/20 |

*Primary Examiner*—Reinhard J. Eisenzopf
*Assistant Examiner*—Philip J. Sobutka
*Attorney, Agent, or Firm*—William B. Ritchie

[57] ABSTRACT

A cable-television usage system that enables subscribers to be charged based upon their actual usage of the cable channels offered. The system is compatible with current cable equipment and methods. It can be installed outside of the subscribers dwelling and it is capable of determining usage for multiple sets and various cable configurations including converter boxes. Channel usage is monitored using the local oscillator tuning circuit that tunes the channel for the subscriber's set. An unique switching design permits the carrier frequency to be acurately measured by briefly disconnecting the cable from the set. An electronic switching arrangement enables the measurement to be made during a random manner corresponding to one pixel's time on the TV screen. The invention also permits polling of subscriber's television preferences without any effort required by the subscribers.

7 Claims, 4 Drawing Sheets

CABLE TELEVISION-USAGE SYSTEM

BACKGROUND OF THE INVENTION

1. Field of the Invention

This invention relates to an apparatus and method for monitoring, recording, and reporting the channels to which a Cable Television (CATV) user is tuned.

2. Description of the Related Art

Cable Television (CATV) has come to play a dominant role in the television industry of the United States and other countries. It has proven attractive to viewers wishing to receive more than the handful of the television signals normally within range for over-the-air television transmission (in the Very High Frequency, VHF, and Ultra High Frequency, UHF, ranges). In addition to signals originally transmitted over the air by television stations all around the country, CATV subscribers generally have access to closed circuit broadcasts including those of movies, sports events, and other special features. Indeed, entire new television networks transmitting only over cable have grown up in response to the spread of CATV.

CATV companies typically bill their subscribers a flat monthly fee in exchange for a certain basic set of channels including over-the-air stations, Cable News Network (CNN), The Weather Channel, and anything else the particular operator decides to supply. These basic channels are available to the subscriber 24 hours a day, regardless of actual use, for a particular contract period (typically a month). For an additional monthly fee the subscribers can receive supplemental channels-such as HBO. Finally, there are Pay-Per-View (PPV) programs available that subscribers can request and pay for on an individual show basis, if available through the particular operator. To receive a pay-per-view, typically the user must contact the CATV originator in order to request that the desired transmission be made accessible-e.g., by the originator unscrambling a normally scrambled transmission, with the attendant incorporation of specialized equipment in the house.

Another way to characterize the flat monthly fee is to state that the subscriber has to pay this fee even if no one in the subscribing household watches any of the CATV programs during the month for which the fee is charged. One reason for this flat fee arrangement has been the general inability of CATV originators to dependably monitor the subscriber's normal day-to-day channel-by-channel usage. This has not been because of a lack of availability of a two way communication system between the CATV originator and each individual subscriber. Indeed, much of the modern operation of "pay-TV"-as indicated above-has depended upon there being some way for 1) the subscriber to electronically order special programs in advance, and 2) for the CATV originator to ensure that an individual subscriber requesting a particular program receives that program. Nevertheless, this two-way communication has remained very limited and has generally required some participation on the part of the subscriber.

The most common technique (see, e.g., U.S. Pat. No. 4,752,954 issued 1988 to MASUKO) for this two-way communication has called for a "polling command signal" to be sent out periodically by the CATV originator, a command designed to elicit a specific response in a single subscriber's in-house cable box. The response sought is a short burst of "upstream" data regarding program requests, billing, and the like which has accumulated since the previous polling signal to that cable subscriber box. The data is processed for each subscriber in turn by circuitry at the CATV originating center. A means must be in place to enable the originator to distinguish one upstream data packet from another.

It is in the nature of the conventional polling system that the data sent upstream has been affirmatively entered at some prior time by a deliberate, discretionary act of the subscriber through the in-house PPV cable box. Although this approach is satisfactory for dealing with orders from the subscriber for limited selective service, it is not practicable for the broader collection of information, especially billing information across the full channel selectivity, which the individual subscriber will not have either the incentive nor the means to provide.

Another approach to providing communication between subscriber and CATV originator has been to suggest the use of local oscillator frequencies generated by the subscriber's television set.

In a cable system, the specific channel frequency allocations are at a separation of 6 MHz starting at 54 MHz and progressing to 546 MHz for a 82 channel system. With even a moderately loaded cable system, of 10 to 20 channels, it is virtually impossible to discriminate the local oscillator frequencies from the channel carrier frequencies, and the intermodulation frequencies. The noise level on the cable also precludes reliable detection of the local oscillator frequency of all channels for a representative set of receivers. It was indicated by FULMER, et al. U.S. Pat. No. 4,723,302 issued on Feb. 2, 1988, that known techniques for monitoring the local oscillator frequencies were "prone to errors caused by extraneous signals." Fulmer attempted to solve the reliable detection of the local oscillator frequency by attempting to detect the harmonics of the local oscillator frequency and assigning a numeric value to each of the harmonics for some statistical detection. If the local oscillator frequency was difficult to detect, the harmonics are significantly more difficult to detect because of their significantly lower power levels. With vacuum tube superheterodyned receivers, this technique may have been possible because of the larger r-f power required; but with solid state receivers, no harmonics could be detected down to an average noise level of $-58$ dbmV for a representative set of television receivers.

An across-the-board usage based system for faithfully and automatically recording all usage of individual channels by the individual subscriber and the relaying this information periodically to the CATV originator is not found in the prior art.

SUMMARY OF THE INVENTION

It is an object of the invention to provide a cable television usage system that enables CATV subscribers to be charged a fee based upon their actual usage of the cable programs.

It is another object of the invention to provide a cable television usage system that eliminates user participation with regard to reporting.

It is still another object of the invention to provide a cable television usage system that is compatible with current cable equipment and methods.

It is still another object of the invention to provide a cable television usage system that does not require any hook-ups within the user's dwelling.

Another object of the invention is to provide a cable television usage system that requires no tuning specific to each user.

It is still another object of the invention to provide a cable television usage system that does not require a power source external to the CATV cable itself.

It is another object of the invention to provide a cable television usage system that is compatible with the standards of the cable distribution network already in place.

It is the final objective of the invention to provide a cable television usage network for determining the length of time during which a particular CATV television set is tuned to each of the channels accessible to it, to store this information, and then to transmit it to the originator of the CATV signal back over the same cable used to carry the original cable signal to the particular television set.

The invention is a cable television-usage system for determining the channel usage of a television set within a dwelling, the television having a plurality of channels, with each the channel having a unique local oscillator signal corresponding to that channel. Channel detection means is provided for detecting the local oscillator signal of the channel that the television is tuned. Signal processing means is provided for converting the signal provided by the channel detection means into a signal corresponding to the channel being used. Timing processing means is provided for measuring the elapsed time that each channel is being used by timing the duration of the signals produced by the signal processing means. Memory storage means is provided for storing the signal provided by the timing processing means. Transmitter means is provided for selectively transmitting the usage time of each channel of the television.

DETAILED DESCRIPTION OF THE INVENTION

Figure 1:
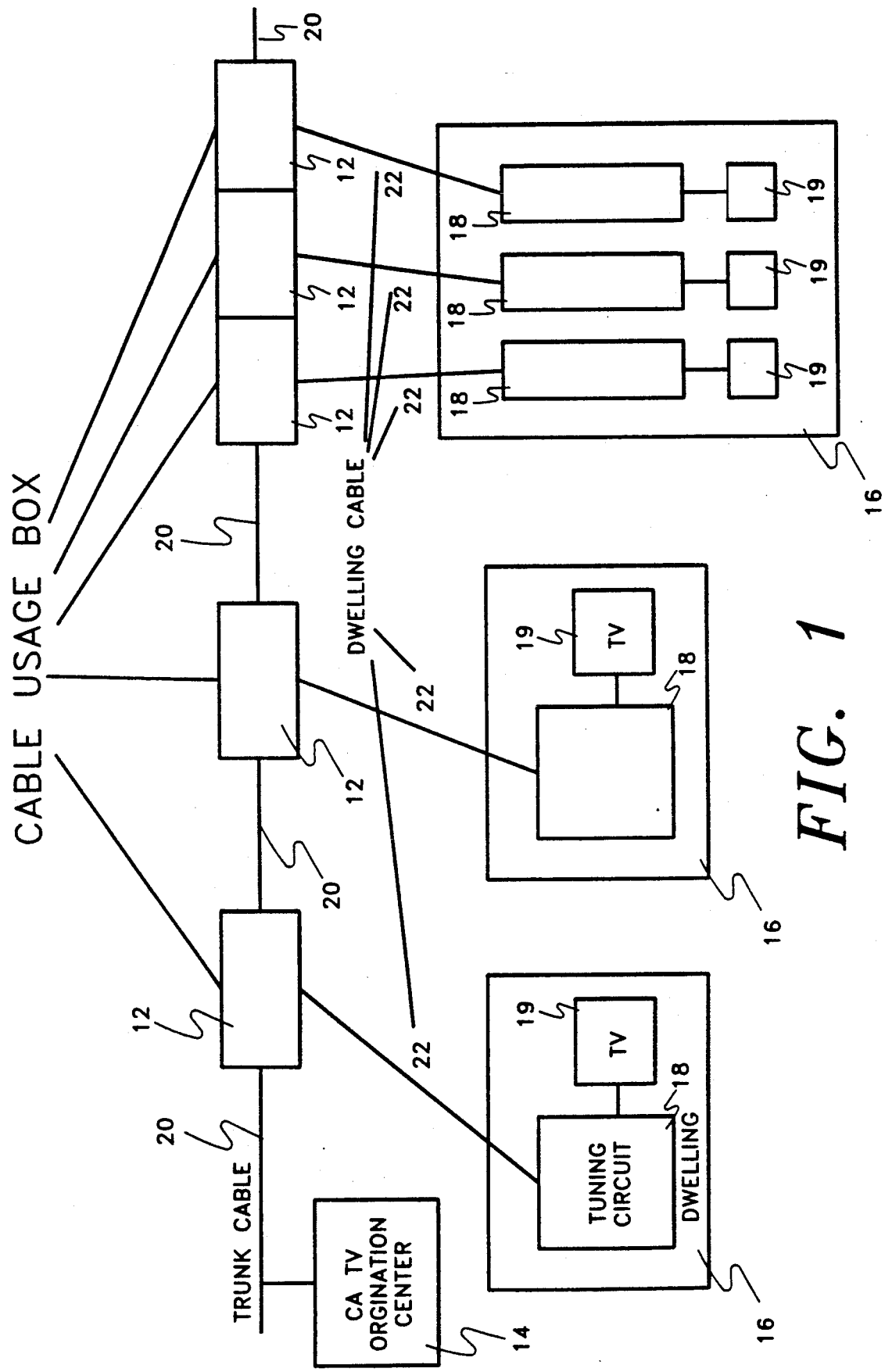
FIG. 1 illustrates a network block diagram in accordance with the invention.

The invention is an apparatus for (1) recording the specific channels to which the device is tuned; and (2) the periods of time for which it is tuned to each respective channel; and (3) for periodically reporting the information, in time units allocated to each channel, to the originator of the cable signal; (4) all without participation by the individual cable user; and (5) without the necessity of intrusion into the individual turning circuit.

The invention is designed to be installed outside the individual subscriber's dwelling. The information which it garners is transmitted upstream to the CATV originator via the same cable through which the television signal is conveyed downstream to the subscribers.

In addition to eliminating any subscriber discretion with respect to entering usage data, the invention also clearly lends itself to the polling of subscribers on such matters as their observations of particular television programs, and segments thereof. Once collected, such information can be marketed to third parties by the CATV originator.

To achieve the above objects, the invention utilizes the local oscillator frequency of the tuning circuit for the television set to identify and otherwise monitor the usage of the respective channels. All of the devices of interest have superheterodyne tuning circuits and thus generate a local oscillator signal for purposes of mixing with the incoming cable carrier frequency. For a given type of cable television set-up (See FIG. 4), the local oscillator frequency is uniquely related to the frequency of the channel being tuned in. More generally, there will be a set of local oscillator frequencies $F_{loc2}$, $F_{loc3}$ . . ., $F_{locj}$ . . . corresponding to a set of incoming channel frequencies. Further, for each channel frequency $F_{cj}$ (j=2, . . . 99) to which the device is tuned there will be a different local oscillator signal frequency $F_{locj}$ and that this signal provides a tell-tale indicator of the channel being used.

The local oscillator signal produced by the tuning circuit within the dwelling is sensed and then processed by the usage box external to the dwelling in order to determine the particular channel being used. The period of time to which the individual tuning circuit is tuned to the particular channel is then measured and the information stored in the storage element of the invention. Periodically, the stored information is transmitted through the cable line to the cable signal originator.

By detecting the local tuning circuit signal $F_{locj}$ rather than the incoming carrier signal $F_{cj}$ from the CATV originator, the present invention operates on the various CATV configurations without adjustment.

The presence of the specific local oscillator frequency can be detected reliably, with a signal-to-noise ratio, S/N, of 10 db or better, when the cable is not connected to the television, because there are no interfering signals nor the resulting intermodulation effects. Therefore, the invention "disconnects" the cable, makes the measurement of the local oscillator frequency, and then reconnects the cable. This disconnect, measurement, and reconnect is done in a very rapid manner; on the order of 200 nanoseconds by means of electronic switching, or one pixel's time on the TV screen. The measurement is done in a pseudo-random manner relative to the television picture frame synchronization. This occurs once per frame. A measurement of only one specific channel is accomplished during any one frame. The present invention is contained in a usage box entirely outside the individual subscriber's dwelling and the information which it garners is transmitted upstream to the CATV originator via the same cable through which the television signal is conveyed downstream to the subscribers.

Although the strength of the invention lies in the fact that it eliminates any subscriber discretion with respect to entering usage data, it also clearly lends itself to the polling of subscribers on such matters as their observations of particular television programs, and segments thereof. Once collected, such information can be marketed to third parties by the CATV originator.

FIG. 1 illustrates a system block diagram and shows the relationship of the cable usage box 12 to a: 1) a CATV origination center 14, from which a number of television signals are transmitted over a range of carrier frequencies, wherein individual carrier frequencies correspond to individual television channels, each of which is generally identified as $F_{cj}$; and 2) a dwelling 16 in which a tuning circuit(s) 18 and television set(s) 19 is located. More particularly, each of the television signals at a particular frequency $F_{cj}$ is transmitted through a common trunk cable 20, to a cable usage box 12, to a dwelling cable 22 which is attached to the tuning circuit 18. At an interface of trunk cable 20 and dwelling cable 22, dwelling cable 22 is attached to cable usage box 12 and then passes through cable usage box 12 to tuning circuit 18. An individual cable usage box 12, in addition to receiving the television signals transmitted by CATV originator center 14, also receives a local signal $F_{locj}$ emanating from tuning circuit 18, and transmitting along dwelling cable 22. The local signal $F_{locj}$ is generated by tuning circuit 18 when the latter is tuned to receive a corresponding television frequency $F_{cj}$. In other words, the local oscillator signal $F_{locj}$ "leaks" back upstream along dwelling cable 22 to cable usage box 12.

Cable usage box 12 then processes the signal $F_{locj}$ to determine the channel to which tuning circuit 18 is tuned. Cable usage box 12 stores all of the signals positively identified as corresponding to the various channels selected by the television user, including the length of time tuning circuit 18 is tuned to each such channel. All of the information stored is then periodically transmitted from cable usage box 12 by means of trunk cable 20 to CATV origination center 14, encoded so as to identify the information sent with the specific subscriber.

Figure 2:
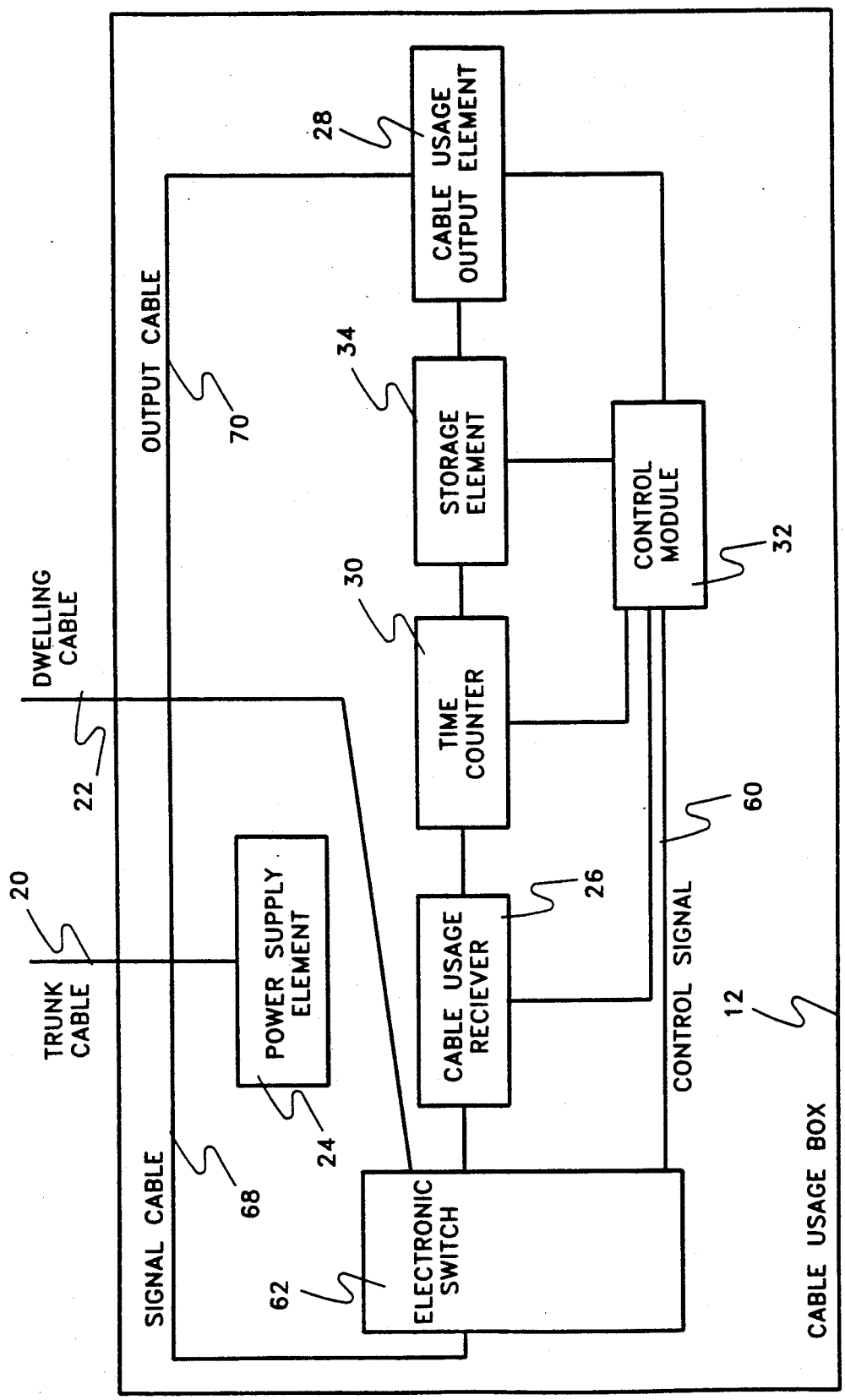
FIG. 2 illustrates a system block diagram in accordance with the invention.

The basic method by which usage box 12 is powered and by which it extracts the needed information can be seen with reference to FIG. 2. As is depicted in FIG. 2, usage box 12 derives the power for its operations directly from trunk cable 20 by means of power supply element 24. Power supply element 24 converts a quasi-square wave from trunk cable 20 into an appropriate direct power for supplying all functional elements of usage box 12.

Continuing to refer to FIG. 2, trunk cable 20 is connected to power supply element 24, Cable Usage Output element 28, and through output cable 70 and through an internal signal cable 68 to the electronic switch 62. Dwelling cable 22 is connected through the electronic switch 62, to a cable usage receiver 26. Receiver 26 in turn transmits positive indications of signals generate at particular frequencies $F_{locj}$, corresponding to carrier frequencies, $F_{cj}$, used by tuning circuit 18 through dwelling cable 22, to the time counter 30. Time counter 30 is controlled by a control module 32, wherein control module 32 operates to direct the counter local oscillator frequencies $F_{locj}$ that identify particular carrier frequencies $F_{cj}$ corresponding to the television channels 2 to 99. When receiver 26 has output a positive transmission related to the detection of those specific frequencies, a cable usage time counter 30 is engaged to indicate the period of time to which particular frequency $F_{locj}$ tuning circuit 18 is tuned. The counter collectively indicates the number of periods the particular frequency $F_{locj}$ has been used during the reporting period; nominally a month. The information of a positive reception by receiver 26 and the time measured by counter 30 are then transmitted to a storage element 34. The indication of a particular frequency and the time units during which the particular frequency is received by cable usage box 12 is transmitted from storage element 34 to output element 28. Output element 28 provides appropriate formatting for a digital word, which is in turn modulated with an appropriate radio frequency for transmission of the stored information. Control module 32 periodically directs output element 28 to transmit the appropriately formatted information through trunk cable 20 upon request to the origination center 14.

Figure 3:
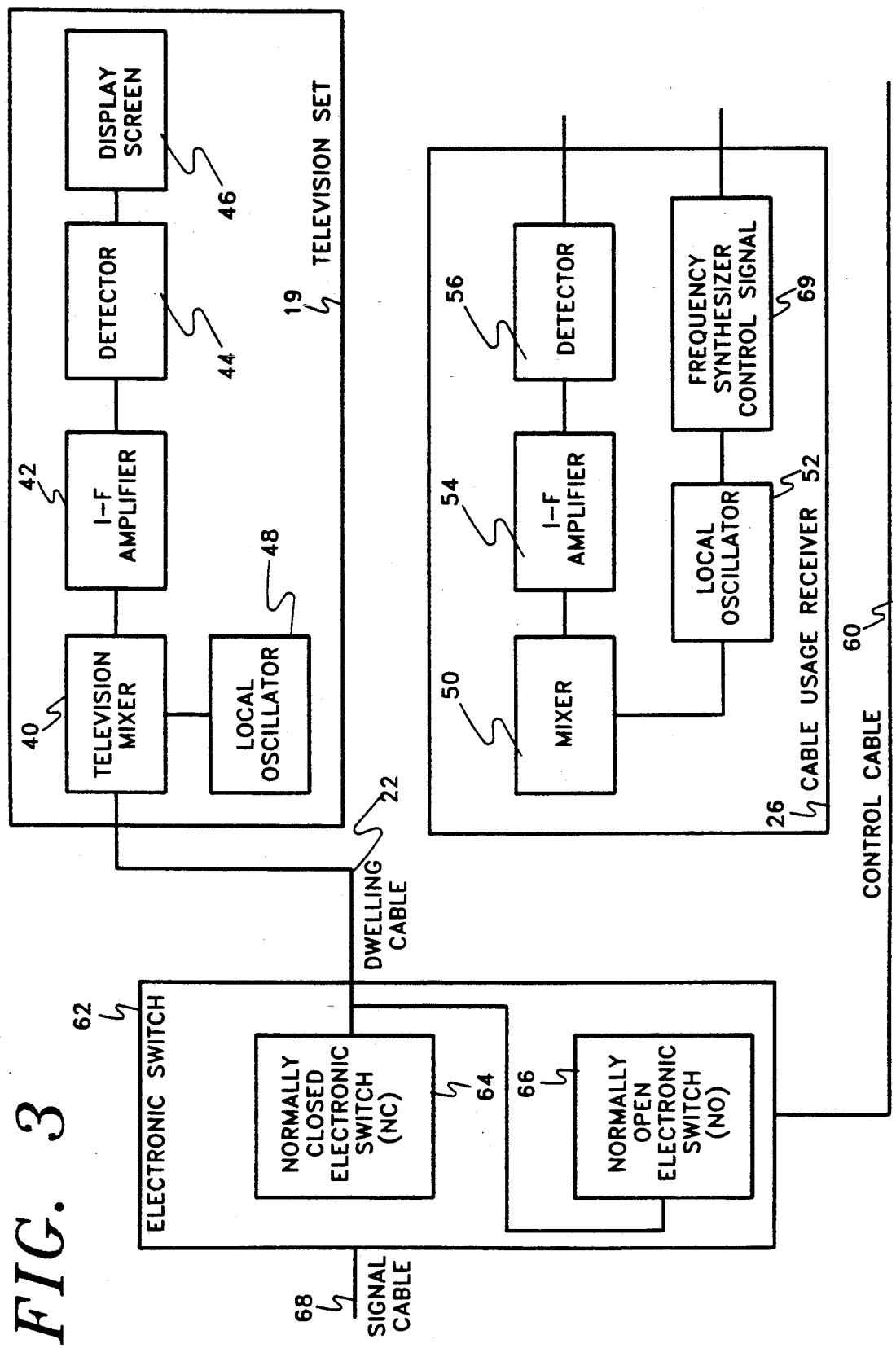
FIG. 3 illustrates a block diagram of the usage system interacting with a tuning circuit of a television set in accordance with the invention.

Referring to FIG. 3, there is illustrated a block diagram of the functional elements of a cable ready television set 19 and cable usage receiver 26 and electronic switch 62. The television signal $F_{cj}$ is transmitted through the internal signal cable 68 to the electronic switch 62, through the normally closed switch 64, television signal transmission $F_{cj}$ is transmitted through dwelling cable 22 to a television mixer 40. Within set 19 a local oscillator frequency $F_{locj}$, is transmitted by a local oscillator 48 to television mixer 40. Television mixer 40 in turn produces two signals at frequencies $F_1$ and $F_2$. $F_1$ corresponds to $F_{locj}+F_{cj}$, and $F_2$ corresponds to $F_{locj}-F_{cj}$. Both signals are transmitted from mixer 40 to i-f amplifier 42 that is tuned to the frequency $F_2$, (intermediate frequency) which is 45 MHz, as is standard in the cable industry. Thus the correlation between $F_{locj}$ and $F_{cj}$ is: $F_{locj}=F_{cj}+45$ MHz. $F_2$, is then provided through a television detector 44 in the appropriate format to a display screen 46.

The local oscillator frequency $F_{locj}$ is provided through dwelling cable 22 to the electronic switch 62. Under control of control signal 60, the normally closed electronic switch 64 which is normally closed is opened for a 200 nanosecond period and terminated in the appropriate terminator. During this same period the normally open electronic switch 66 which is normally open, is closed and connected to dwelling cable 22. During this 200 nanosecond period the local oscillator frequency $F_{locj}$ from local oscillator 48 is provided to the cable usage receiver 26. Within the cable usage receiver 26, a local oscillator frequency, $F_{locj2}$ is transmitted by local oscillator 52 to cable usage mixer 50. Local oscillator 52 sequences through specific frequencies, initiated by a microprocessor with control provided by frequency synthesizer control signal 69. The local oscillator signals are combined in cable usage mixer 50 with the television local oscillator frequency $F_{locj}$ generated by local oscillator 48. Cable usage mixer 50 in turn transmits a cable usage frequency, $F_3$, the i-f frequency of the cable usage receiver, to cable usage i-f amplifier 54 and a cable usage detector 56, both of which are available in combination on an industry standard i-f strip. Usage detector 56 provides information to an industry standard microprocessor of: 1) a positive transmission that television local oscillator 48 is in fact generating a signal at frequency $F_{locj}$ corresponding to the television channel to which cable-ready television set 19 is tuned.

Figure 4:
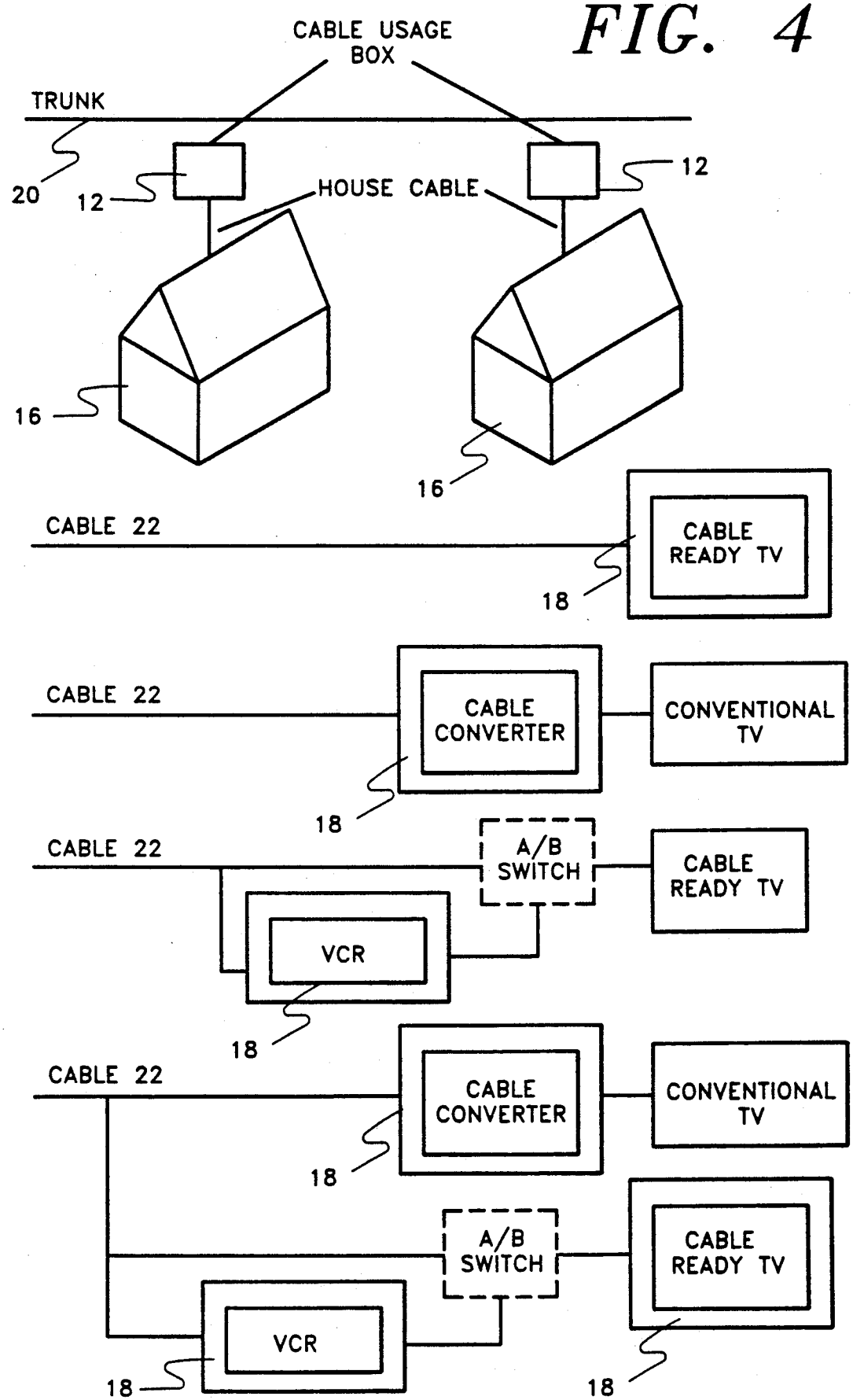
FIG. 4 illustrates a block of possible configurations of subscriber television sets, the location of the tuning circuits of interest, and connection to the cable provided signal in accordance with the invention.

FIG. 4 illustrates a block diagram of possible configurations of subscriber television sets, the location of the tuning circuits of interest, and connection to the cable provided signal in accordance with the invention. The various set configurations may be individually or collectively connected to the dwelling cable 22 inside the dwelling. Also, note that tuning circuit 18 may be located within the television set as in the cable-ready example, or in the cable converter box or VCR unit. The cable usage box 12 will sequence through all of the possible channel frequencies, thereby ascertaining the use of any and all of the channels by any of the device configurations shown.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A cable television-usage system for determining the channel usage of a television set within a dwelling, said television having a plurality of channels, with each said channel having a unique local oscillator signal corresponding to that channel comprising:

channel detection means for detecting the local oscillator signal of the channel that said television is tuned;

signal processing means for converting said local oscillator signal provided by said channel detection means into a signal corresponding to the channel being used;

timing processing means for measuring the elapsed time that each channel is being used by timing the duration of the signals produced by said signal processing means; and providing a signal representing the usage time of each channel of said television;

memory storage means for storing said signal provided by said timing processing means; and transmitter means for selectively transmitting said usage time of each channel of said television; and wherein said channel detection means further comprises:

switching means for electronically disconnecting the cable from each said television set during the interval when said channel detection means is detecting the local oscillator signal of the channel being used.

2. The cable-usage system of claim 1 wherein said switching means has a switching time corresponding to the time required to display one pixel on the screen of said television.

3. The cable usage system of claim 2 wherein said switching means randomly switches within the time period corresponding to each frame of the television picture of said television.

4. The cable-usage system of claim 3 wherein said channel detection means detects only one channel during each frame of the television picture of said television.

5. The cable-usage system of claim 4 further comprising set identification means for encoding a unique signal corresponding to said television set.

6. The cable-usage system of claim 5 wherein said system is external to the dwelling in which said television set is located.

7. A cable television-usage network for determining the channel usage for each television set on the subscriber network, each said television set having a plurality of channels, with each said channel having a unique local oscillator signal corresponding to that channel comprising:

cable connecting means, connecting said network, for transmitting a plurality of carrier frequencies to each subscriber television set attached to said network wherein each carrier frequency corresponds to a channel of said television sets;

set recording means, attached to each said television set, external to the dwelling in which said set is located, for recording the time that each channel has been used; wherein said set recording means further comprises switching means for electronically disconnecting the cable from said television set during the interval when the local oscillator signal of the channel being used to indicate channel usage is measured; and central processing means, connected to said network, for tabulating the usage of each channel for each subscriber on the network for a selected reporting period of time.

* * * * *